(12) United States Patent
Gale et al.

(10) Patent No.: US 7,962,145 B2
(45) Date of Patent: Jun. 14, 2011

(54) ANTENNA SYSTEM

(75) Inventors: Simon Gale, Bishops Stortford (GB); Andrew Urquhart, Bishops Stortford (GB)

(73) Assignee: Nortel Networks Limited, Mississauga, ON (CA)

( * ) Notice: Subject to any disclaimer, the term of this patent is extended or adjusted under 35 U.S.C. 154(b) by 753 days.

(21) Appl. No.: 11/966,556

(22) Filed: Dec. 28, 2007

(65) Prior Publication Data

US 2010/0048218 A1  Feb. 25, 2010

(30) Foreign Application Priority Data

Jan. 16, 2007 (GB) .................................. 0700801.4
May 25, 2007 (GB) .................................. 0710077.9

(51) Int. Cl.
*H04Q 7/20* (2006.01)

(52) U.S. Cl. ..................... 455/450; 370/342; 375/295

(58) Field of Classification Search .................. None
See application file for complete search history.

(56) References Cited

U.S. PATENT DOCUMENTS

| | | |
|---|---|---|
| 6,839,539 B2 | 1/2005 | Durrant |
| 2003/0153316 A1 | 8/2003 | Noll |
| 2004/0062214 A1 | 4/2004 | Schnack |

FOREIGN PATENT DOCUMENTS

| | | |
|---|---|---|
| EP | 1507371 A | 2/2005 |
| WO | WO-01/54431 A | 7/2001 |

OTHER PUBLICATIONS

Search report for PCT/EP2008/050472, filed Jan. 16, 2008.

*Primary Examiner* — Phuoc Doan
(74) *Attorney, Agent, or Firm* — Barnes & Thornburg LLP

(57) ABSTRACT

Embodiments of the invention relate to wireless communications networks, and more specifically to an antenna apparatus for cellular wireless systems. Increasing data capacity of cellular wireless systems places increasing demands on the capacity of the two way connection, known as backhaul, between a cellular base station and a telecommunications network such as the PSTN backhaul, since this is the connection that has to convey the wireless-originating traffic to its destination, often in an entirely different network. Known backhaul links include leased lines, microwave links, optical fiber links or radio resources for relaying backhaul traffic between base stations. The fixed line solutions are expensive to implement and maintain, while the radio solutions antenna configurations that are not ideal for relaying data between base stations. In embodiments of the invention, communication between base stations occurs in a first timeslot by use of a first antenna system and communication between a given base station and a user equipment occurs in a second timeslot using a second antenna system. The benefit of this method is that the first antenna system can be optimized for use in communication between base stations, whereas the second antenna system can be optimized for communication with user equipment which preferably occurs within the area of cellular wireless coverage of the sector served by the second antenna system.

13 Claims, 11 Drawing Sheets

ANTENNA SYSTEM

FIELD OF THE INVENTION

The present invention relates generally to antenna systems for wireless communications networks, and more specifically to a method and antenna apparatus relating to wireless backhaul for cellular wireless systems.

BACKGROUND OF THE INVENTION

Mobile telephony systems, in which user equipment such as mobile handsets communicate via wireless links to a network of base stations connected to a telecommunications network, have undergone rapid development through a number of generations. The initial deployment of systems using analogue modulation has been be superseded by second generation digital systems, which are themselves currently being superseded by third generation digital systems such as UMTS and CDMA. Third generation standards provide for a greater throughput of data than is provided by second generation systems; this trend is continued with the proposal by the Third Generation Partnership Project of the so-called Long Term Evolution system, often simply called LTE, which offers potentially greater capacity still, by the use of wider frequency bands, spectrally efficient modulation techniques and potentially also the exploitation of spatially diverse propagation paths to increase capacity (Multiple In Multiple Out).

Distinct from mobile telephony systems, wireless access systems have also undergone development, initially aimed at providing the "last mile" (or thereabouts) connection between user equipment at a subscriber's premises and the public switched telephone network (PSTN). Such user equipment is typically a terminal to which a telephone or computer is connected, and with early systems there was no provision for mobility or roaming of the user equipment between base stations. However, the WiMax standard (IEEE 802.16) has provided a means for such terminals to connect to the PSTN via high data rate wireless access systems.

Whilst WiMax and LTE have evolved via different routes, both can be characterised as high capacity wireless data systems that serve a similar purpose, typically using similar technology, and in addition both are deployed in a cellular layout as cellular wireless systems. Typically such cellular wireless systems comprise user equipment such as mobile telephony handsets or wireless terminals, a number of base stations, each potentially communicating over what are termed access links with many user equipments located in a coverage area known as a cell, and a two way connection, known as backhaul, between each base station and a telecommunications network such as the PSTN.

As the data capacity of cellular wireless systems increases, this in turn places increasing demands on the capacity of the backhaul, since this is the connection that has to convey the wireless-originating traffic to its destination, often in an entirely different network. For earlier generations of cellular wireless systems, the backhaul has been provided by one or more connections leased from another telecommunications operator (where such a connection exists near to the base station); however, in view of the increasing data rates, the number of leased lines that is required is also increasing. Consequently, the operational expense associated with adopting multiple leased lines has also increased, making this a potentially expensive option for high capacity systems.

As an alternative to leased lines, dedicated backhaul links can be provided by a variety of methods including microwave links or optical fibre links. However each of these methods of backhaul has associated costs. Dedicated fibre links can be expensive in terms of capital expense due mainly to the cost of the civil works in installation, and this problem is especially acute in urban areas. Microwave links also involve the capital expense of equipment and require expert installation due to narrow beam widths leading to the requirement for precise alignment of antennas.

As an alternative to the provision of a dedicated backhaul link for each individual base station, it is possible to use the radio resource of the cellular wireless system to relay backhaul traffic from one base station to another. Typically, the base station using the cellular radio resource for backhaul is a small low power base station with an omnidirectional antenna known as a relay node. Such a system can be used to extend the area of cellular wireless coverage beyond the area of coverage of conventional base stations that are already equipped with a dedicated backhaul.

FIG. 1 shows a conventional relay node operating within a cellular wireless network; the operation may for example be in accordance with IEEE 802.16j. A user equipment 5b is in communication with a relay node base station 3. As already mentioned, the relay node typically employs an omnidirectional antenna giving a uniform radiation pattern 15 in azimuth. As the relay node 3 is not provided with a backhaul link separate from the cellular wireless resource, the relay node is allocated radio resource timeslots for use relaying backhaul data to and from the adjacent base station 1 which is itself connected by microwave link to a microwave station 7 and thence to a telecommunications network such as the public switched telephone network The base station 1 in this example employs a conventional tri-cellular coverage scheme; three antennas are each connected to a radio transceiver at the base station and the radiation pattern consists of three lobes 11a, 11b and 11c. A user equipment 5a is shown in communication with the base station 1 via antenna pattern lobe 11c. It should be noted that the antennas employed by the base station 1 to give the tri-sectored coverage scheme are optimized to give coverage within this particular cellular scheme; as a result there are regions between the antenna lobes 11a, 11b, 11c with little coverage from the base station, as these areas are designed to be covered by a neighbouring base station. So it can be seen that the base station antennas are not designed to give even coverage over 360 degrees from an individual base station. Also, the antennas on the tri-cellular base station 1 are given a deliberate down-tilt of several degrees to give good coverage within the sector in question while minimizing interference with other base stations. As a result, this antenna arrangement may not be ideal for communication with a relay node 3 outside the normal area of coverage of the base station 1, as, depending on its location, the relay node may fall in a null between the lobes in the tri-cellular radiation pattern and in addition the down-tilt of the antennas may reduce gain beyond a certain distance from the base station.

FIG. 2 shows a time frame structure allocating timeslots alternately to access 17a . . . 17d and backhaul 19a . . . 19c. Typically, all of the access payload data will be relayed by the backhaul link; if the spectral efficiency of the backhaul and access links is the same, then the access and backhaul timeslots will occupy approximately equal amounts of time. There may be a significant reduction in capacity available in the access links to the user equipment due to the need to reserve timeslots for backhaul. This problem is exacerbated in the IEEE 802.16j scheme, where the allocation of timeslots to backhaul is localized around the area of the relay node.

Hence it can be seen that backhaul links for high capacity cellular wireless systems can present a significant expense; to mitigate this, the cellular wireless resource can be used to relay backhaul links from one base station to another, but when employed in conventional arrangements, this incurs significant limitations to data capacity and restrictions on the positioning of base stations.

SUMMARY OF THE INVENTION

In accordance with a first aspect of the present invention, there is provided a system for transceiving signals in a cellular wireless communications network, the cellular wireless communications network comprising a first base station, a second base station and a user equipment terminal, the system being arranged to receive a message apportioning timeslots for particular types of transmission, said message being received at the first base station, the second base station and said user equipment terminal, wherein the system is arranged to transceive first signals between said first base station and said second base station in a first timeslot on the basis of timeslots apportioned in said message, and to transceive second signals between said first base station and said user equipment terminal in a second timeslot on the basis of timeslots apportioned in said message, the second signals occupying at least part of the frequency band occupied by the first signals, wherein the system comprises:

a first antenna system of a first type arranged to transceive said first signals at the first base station; and a second antenna system of a second type, different from the first type of antenna system, arranged to transceive said second signals at said the base station.

Thus in embodiments of the invention, communication between the first base station and the second base station occurs in a first timeslot by use of a first antenna system and communication between the first base station and a user equipment occurs in a second timeslot using a second antenna system. The benefit of this method is that the first antenna system can be optimised for use in communication with the second base station, whereas the second antenna system can be optimised for communication with user equipment which preferably occurs within the area of cellular wireless coverage of the sector served by the second antenna.

Preferably, the radiation pattern of the first antenna is narrower in azimuth than that of the second antenna. A narrower beam is beneficial since this increases the gain of the beam and reduces the transmitted and received interference signal power. A stronger ratio of signal to noise and interference received in the link between base stations enables a higher data rate so that a smaller share of the available timeslots is required for the link between the first and second base stations. It is feasible that the first antenna can have a narrower beam in azimuth than the second antenna, since the first antenna receives signals only from the second base station—which is fixed in location—whereas the second antenna has to receive signals from user equipments, which are mobile and can potentially be present in any part of the sector of the second antenna.

Conveniently, the first or second antenna system is selected for connection to a transceiver by a radio frequency switch; this has the benefit that a single radio transceiver and feeder cable can be shared between transceiving signals in the first and second timeslots.

Preferably, the control of the radio frequency switch is by means of the detection of a power characteristic at the output of the transceiver and by means of decoding of a message representing the switching point with respect to the power characteristic; this advantageously removes the need for a dedicated control cable between the transceiver and the switch and thus reduces the costs of the transceiving system.

In one arrangement, the first antenna system comprises an antenna array and the second antenna system comprises a subset of the antenna array; this has the advantage of minimising the size of the combination of the first and the second antenna systems.

Conveniently, the first and second antenna systems are implemented by applying alternative amplitude and phase weighting values to a multi-element beamformer. On reception, a multi-element beamformer receives signals from an array of antenna elements and modifies the amplitude and phase characteristic of the signal from each antenna element and combines the signals to form a single output. On transmission, a multi-element beamformer receives a single input signal, splits the signal into multiple components, and modifies the amplitude and phase characteristics of each signal transmitted to each antenna element. This has the benefit that the antenna pattern of the array of antenna elements can be controlled by the application of weighting values in a programmable manner without physical modification to the antenna array.

Further features and advantages of the invention will become apparent from the following description of preferred embodiments of the invention, given by way of example only, which is made with reference to the accompanying drawings.

DETAILED DESCRIPTION OF THE INVENTION

In general, the present invention is directed to methods and apparatus that provide backhaul by using the cellular wireless resource within a cellular wireless system. For clarity, the methods and apparatus are described in the context of a high speed packet data system such as IEEE802.16 (WiMax) or LTE, but it will be appreciated that this is by way of example and that the methods and apparatus described are not limited to this example.

Figure 1:
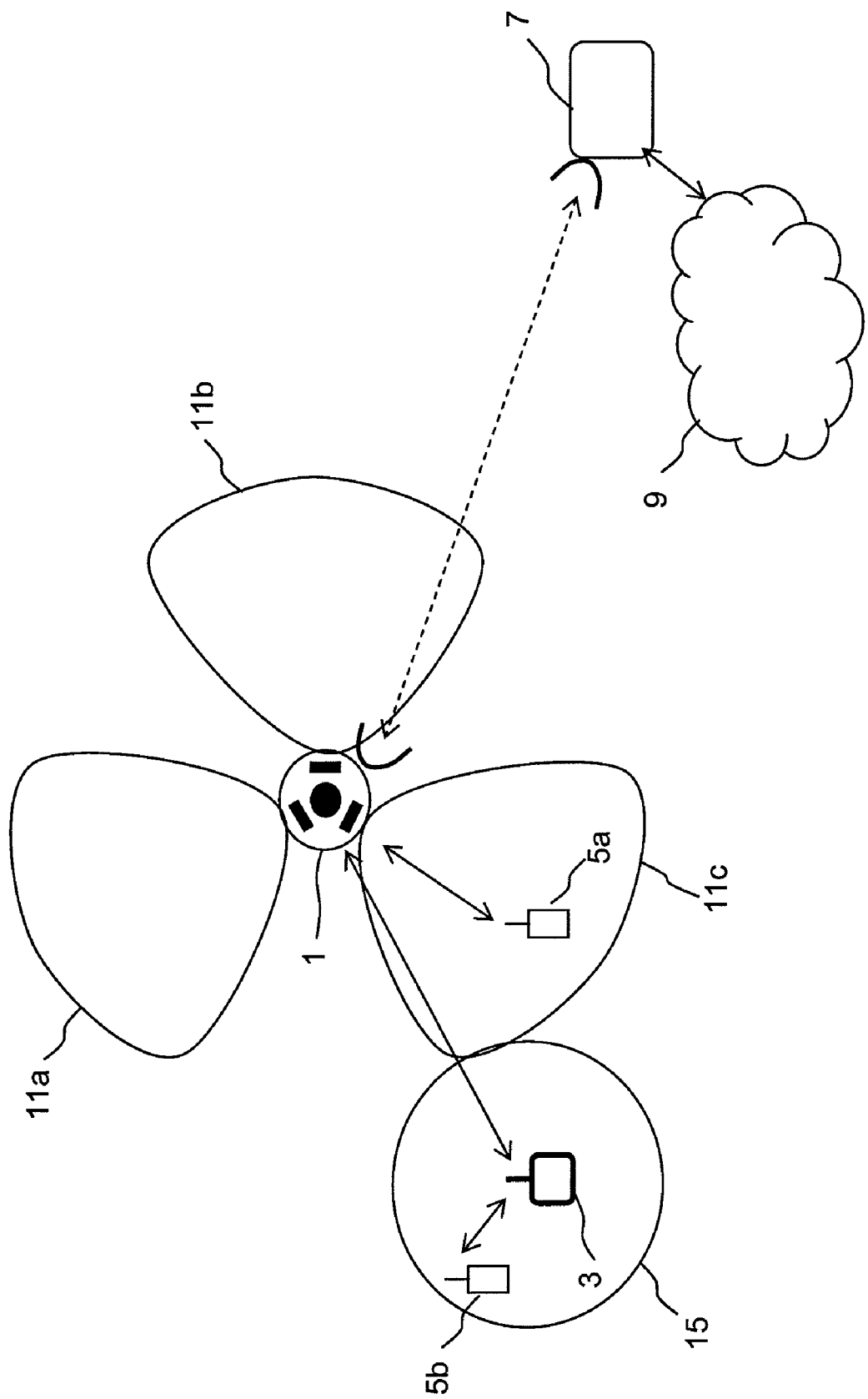
FIG. 1 is a schematic diagram showing a conventional relay node in communication with a tri-cellular base station.
Figure 2:
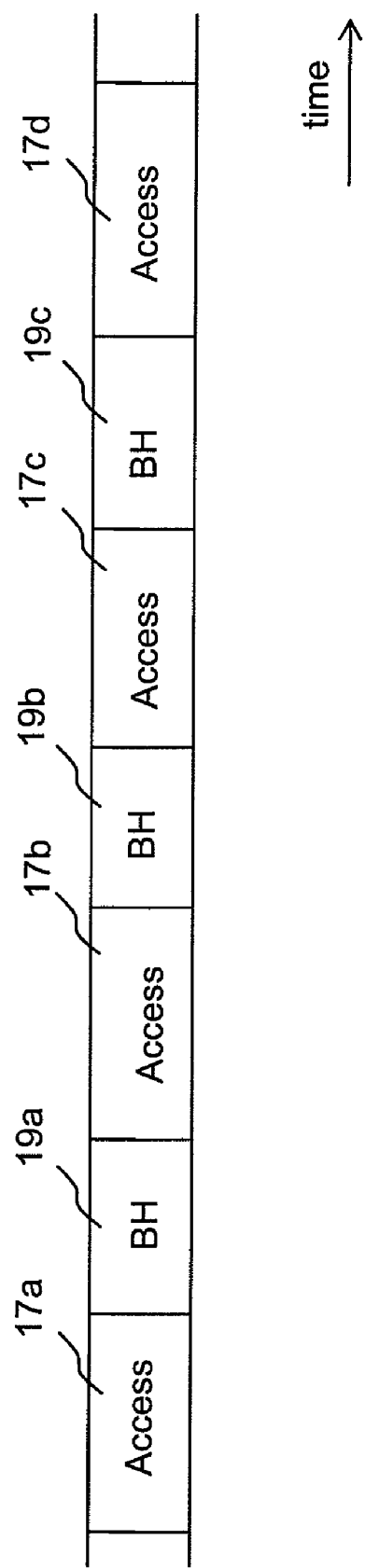
FIG. 2 is a schematic diagram showing a conventional frame structure enabling timesharing between backhaul and access components within a local area.
Figure 3:
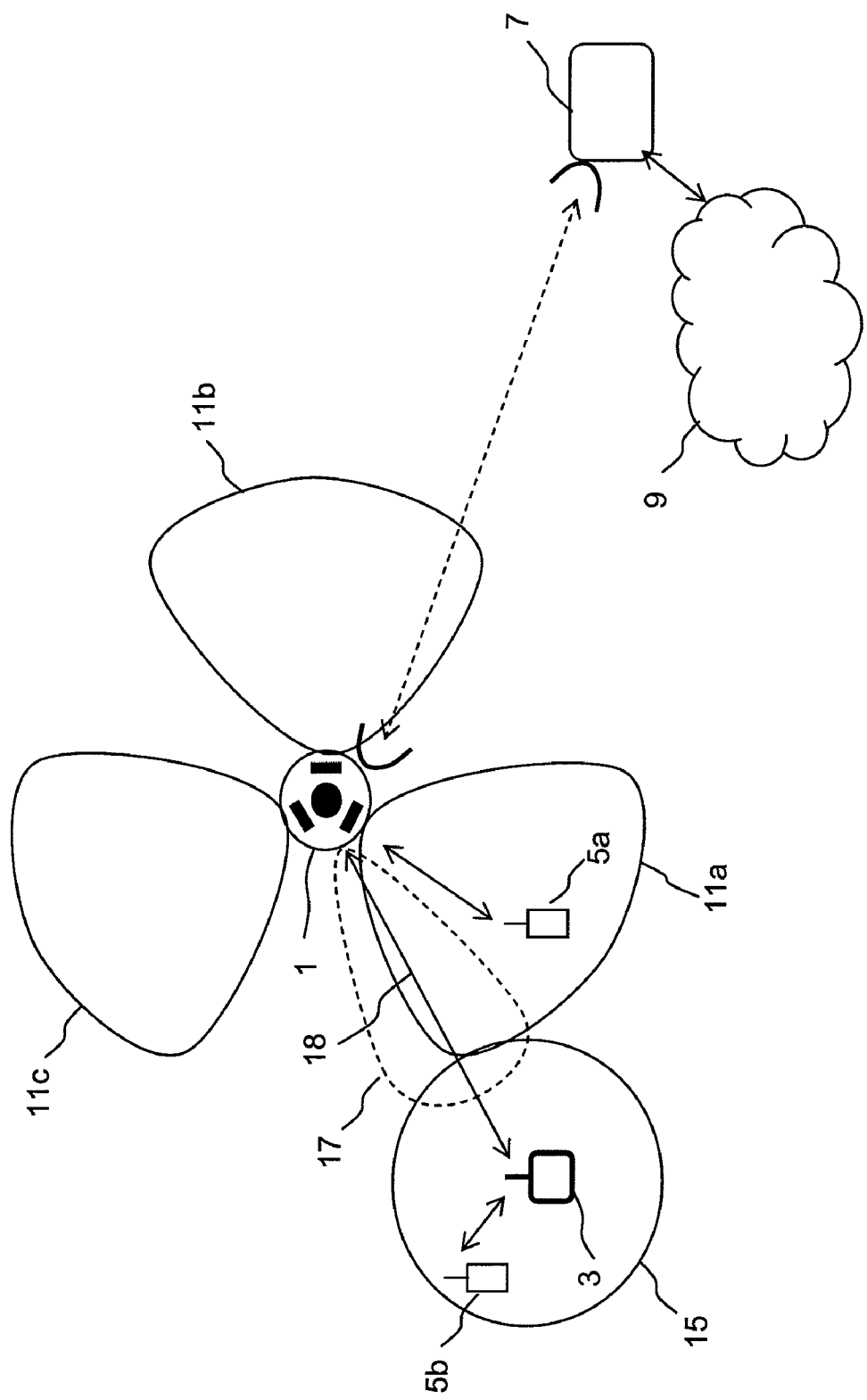
FIG. 3 is a schematic diagram showing a transceiving system according to an embodiment of the invention.

FIG. 3 shows a first embodiment of the invention. As in the case of conventional arrangements, a user equipment 5b is in communication with a relay node base station 3, the relay node producing an omnidirectional radiation pattern 15. Backhaul from the relay node 3 is provided by a link 18 to a base station 1 which itself has a microwave link to a microwave station 7 and thence to a telecommunications network 9. In the system illustrated in FIG. 1, the backhaul link 18 from the relay node 3 to the base station 1 is via lobe 11a of the radiation pattern produced by the base station 1, which is optimized for access connections, such as that between the base station 1 and the user equipment indicated by reference numeral 5a. In the embodiment illustrated in FIG. 3, however, the backhaul link between the relay node base station 3 and the base station 1 is carried by a different lobe 17 of the radiation pattern of the base station 1; this is because the base station 1 uses a different antenna system when backhaul messages are transmitted and received than it does when access messages are transmitted and received.

As a result, the link 18 in the direction of the relay node can be optimized, by using an antenna beam pointed directly at the relay node. The radiation pattern of the beam 17 can be narrower in azimuth than that of the beam 11a used for access, since it is not necessary to give coverage over the breadth of a given sector; this allows the gain of the beam to be increased, potentially improving the signal to noise and interference ratio of the link to the relay node by increasing the received signal strength and reducing the probability of interference falling within the beam. An improved signal to noise plus interference ratio enables the data rate of the backhaul link to be increased by means of adaptive modulation and coding; as a result, the proportion of time allocated to the backhaul link can be reduced, thereby increasing the potential capacity of the access links and providing more time for use in access than is available in conventional systems. The signal to noise plus interference ratio may be further improved by the use of an additional radiation pattern lobe at the relay node.

Figure 4:
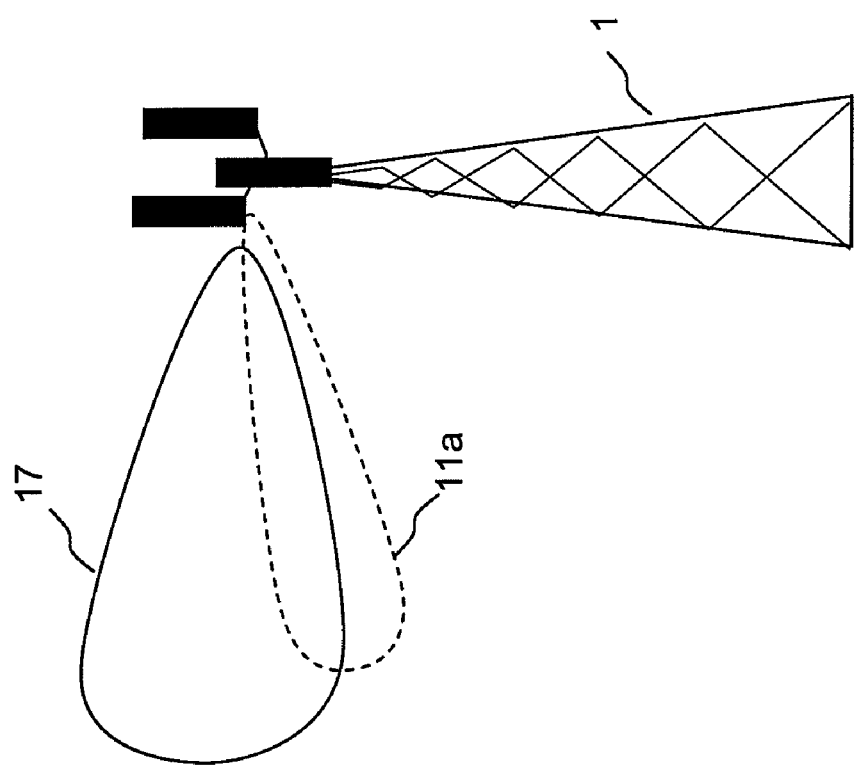
FIG. 4 is a schematic diagram showing access and backhaul beam patterns generated by the transceiving system of FIG. 3 in elevation.

FIG. 4 shows the backhaul beam 17 and access beam 11a at base station 1 in elevation. It can be seen that the access beam 11a has considerable downtilt relative to the backhaul beam 17; this is undesirable for use in backhaul if the base station with which communication is desired is at the extremes of the coverage area or mounted on a tower. Accordingly, it is preferable not to apply downtilt to the backhaul beam 17. Also, the backhaul beam 17 is somewhat broader in elevation that is the access beam 11a; unlike the downtilt this can be tolerated because the reduction in azimuth beamwidth of the backhaul beam 17 relative to the access beam 11a gives an improvement in gain that more than compensates for a broadening of the beam in elevation. An advantage to be had from a broadening of the backhaul beam in elevation is that the antenna size can be reduced, with consequent reduction in wind loading and tower rental fees that may be charged per square foot of antenna area.

Figure 5:
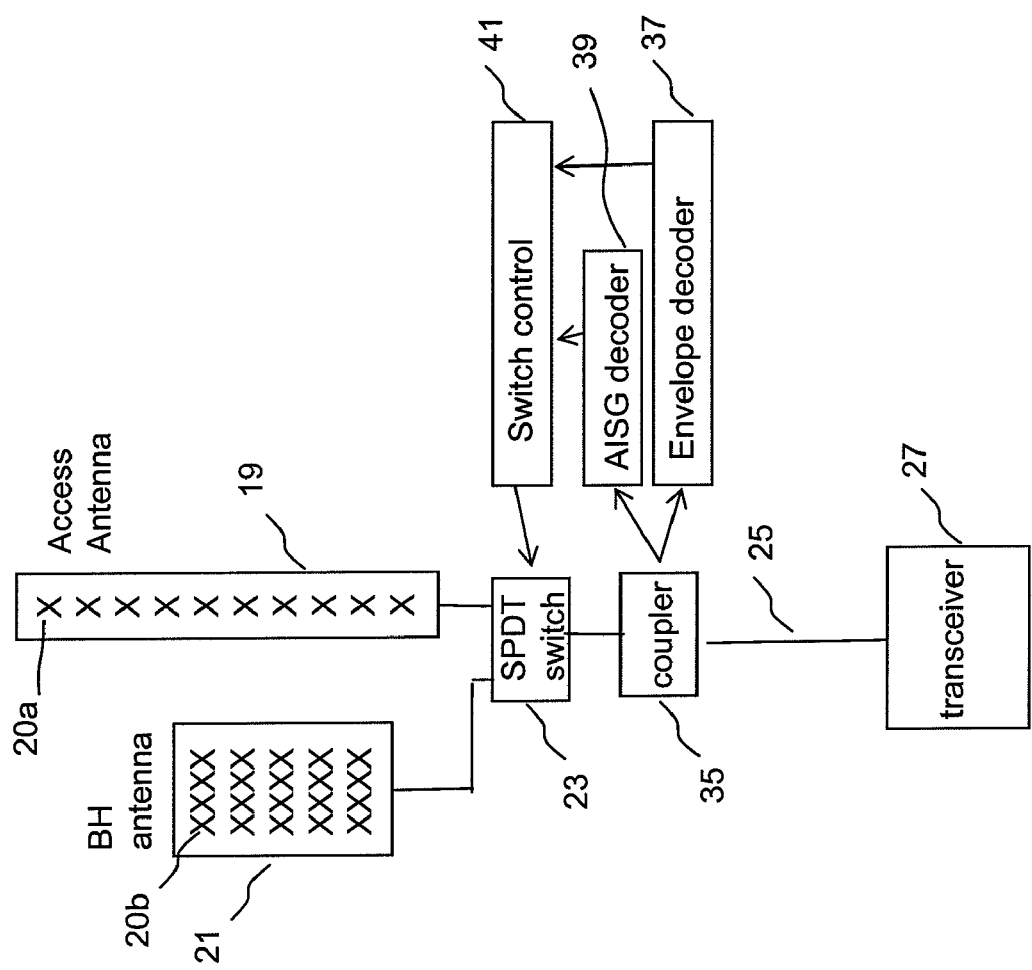
FIG. 5 is a schematic diagram showing an implementation of an antenna selection system forming part of the transceiving system of FIG. 3.

FIG. 5 shows a block diagram of a switched antenna system according to an embodiment of the invention. The antenna system comprises a backhaul antenna and an access antenna 19, 21, together with associated control components, as will now be described in more detail. The access antenna 19 is shown as a vertical array of antenna elements 20a; this is a typical structure that gives a broad beam in azimuth and a narrow beam in elevation. On reception, the signals received from the antenna elements 20a are combined together, and on transmission the transmitted signals are split between the antenna elements. The backhaul antenna 21 shown is also constructed from an array of antenna elements 20b; in a preferred arrangement the backhaul antenna 21 is four elements in width rather than a single element wide, as was the case for the access antenna, giving the access antenna a relatively narrower beam in azimuth. However, the skilled person will appreciate that the backhaul antenna 21 could alternatively have a width equivalent to two, three, or more elements and still provide a relatively narrower beam in azimuth. The increased gain associated with the narrower beamwidth in azimuth allows a reduction in the height of the antenna, increasing the beamwidth in elevation, as discussed.

A single pole double throw (SPDT) switch 23 is used to select the backhaul antenna 21 within a backhaul timeslot and the access antenna 19 within an access timeslot. Typically, the switch 23 would be a PIN (P-type Intrinsic N-type) diode switch designed to carry the high power of the transmitted signals.

In one arrangement the antennas 19, 21, switch 23 and associated switch control components 35, 37, 39, 41 are mounted at the top of an antenna tower while a radio transceiver 27 is mounted at the bottom of the tower, for ease of maintenance. The transceiver 27 is connected to the tower top components by a feed cable 25. It is generally costly to install additional cables between the bottom and the top of a tower; hence it is preferable to position the antenna switch 23 at the top of the tower, to remove the need for a second feed cable that would be required if the switch were positioned at the bottom of the tower. It is similarly undesirable to install a control cable between the transceiver 27 and the switch 23. A consequence of the avoidance of the installation of additional cables is that the control of the switch 23 is preferably arranged to be derived from signals present on the feed cable 25. Typically, no existing interface to the feed cables 25 is available that is sufficiently fast to operate at the speed of the backhaul/access switching; accordingly, a method is used whereby a message on an existing antenna control interface, such as the industry standard AISG interface, is used to define switching points with respect to a counter. A counter is then synchronized to the detected power envelope of the transmit/receive waveform.

The operation of the switch control is thus as follows. Signals are coupled from the feeder cable 25 using a coupler 35 and AISG messages are decoded in an AISG decoder 39. These messages represent the required antenna switching points in terms of the count on a counter. An envelope detector 37 detects the transmit/receive power envelope and passes the detected waveform to the switch control 41. The switch control 41 synchronises a conventional flywheel counter with the power envelope signal, such that a given count on the counter consistently represents a given phase of the transmit/receive cycle. A comparator switches the state of the switch at the count values indicated by the AISG message.

FIG. 5 represents the transmission and reception of signals using antennas with a single state of polarization; transmission and reception of signals on orthogonal polarisations can be carried out by employing antennas with dual polarization outputs and duplicating the switch 23, feed cable 25 and transceiver 27; one set of switch control circuitry 35, 37, 39, 41 could be used to control the switches 23 on both polarizations. Similarly, any of the embodiments can be implemented in dual polar form by the suitable duplication of signal paths.

Figure 6:
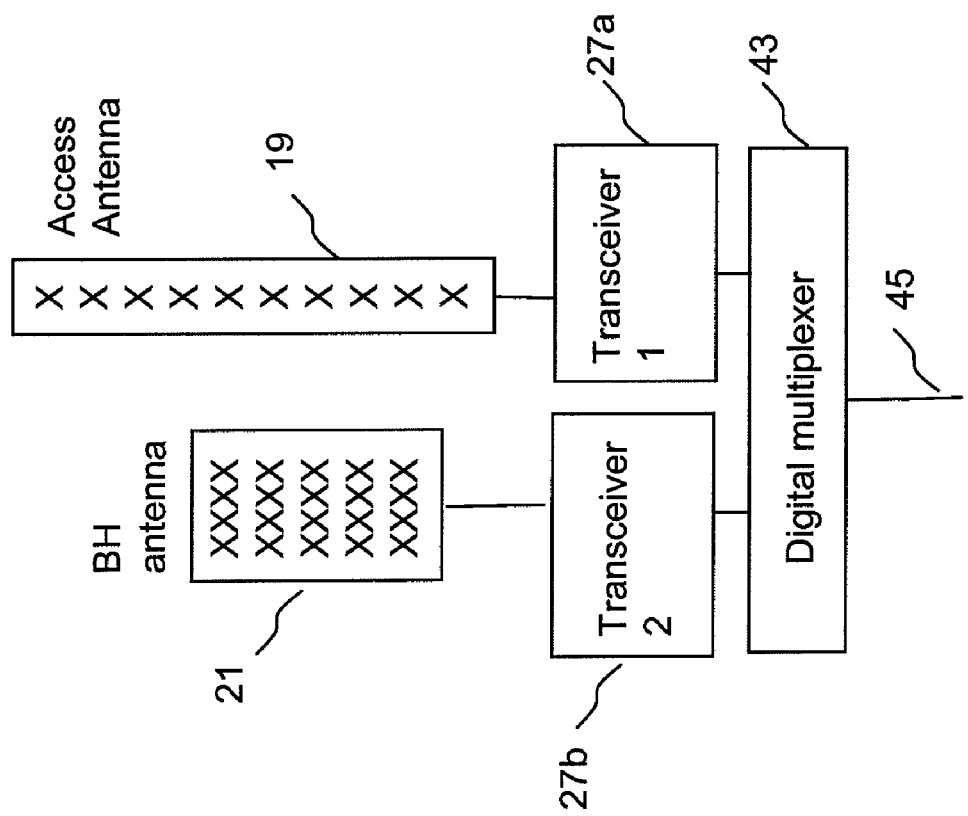
FIG. 6 is a schematic diagram showing an alternative implementation of an antenna selection system forming part of the transceiving system of FIG. 3.

FIG. 6 shows an alternative embodiment of a switched antenna system. The access antenna 19 and backhaul antenna 21 are similar to those in the system of FIG. 5, but in this embodiment a radio frequency switch is not required; instead two duplicate transceivers 27a, 27b are utilised. Typically the transceivers 27a, 27b would be sited at the top of the antenna tower close to the antennas 19, 21, and the switching between access and backhaul mode is then carried out by a digital multiplexer 43. The need for a feeder cable that is low loss and typically heavy and expensive is thus removed, and a lightweight and cheap optical fibre cable 45 could instead be used as a backhaul connection. For this embodiment to be economically viable, the requirement is that it should be cheaper to use two transceivers that share the same RF channel than one specially modified transceiver intended to operate in a different RF frequency band (as in conventional microwave backhaul systems), and in addition, the transceivers should be reliable enough to be placed at the top of the antenna tower, given the cost associated with maintenance at that location.

Figure 7:
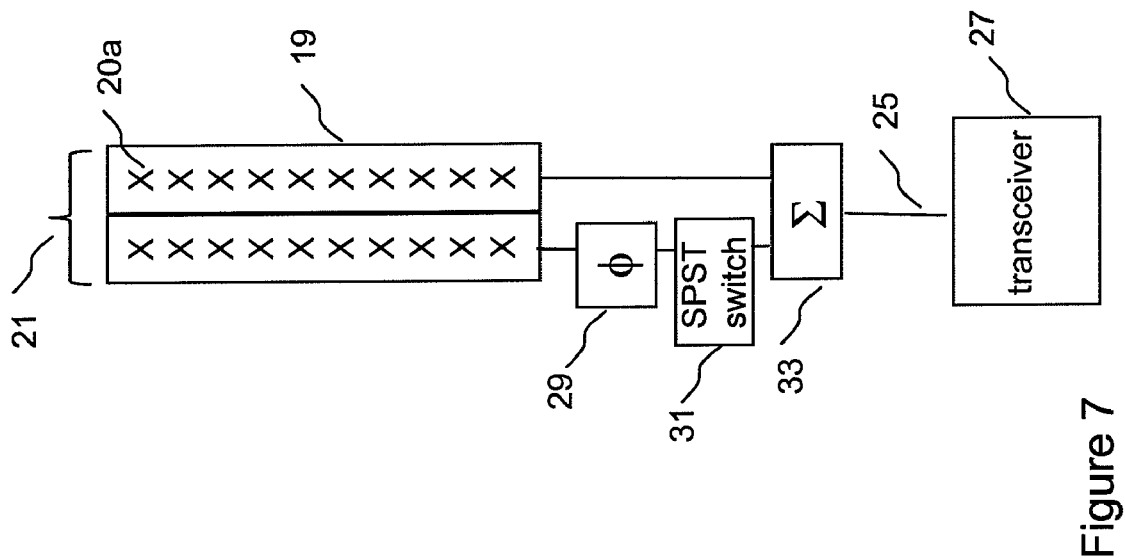
FIG. 7 is a schematic diagram showing a yet further implementation of an antenna system forming part of the transceiving system of FIG. 3.

FIG. 7 shows a further alternative embodiment of a switched antenna system. In this system, an antenna array 21 is used with some elements switched in or out of use according to whether a backhaul antenna 21 or access antenna 19 is required. As shown, the array has two columns of ten elements 20a. For access mode, a single column 19 is connected through a combiner/splitter 33 to a transceiver 27. For backhaul mode, the second column is switched in, thereby narrowing the beam. A phase shifter 29 determines the relative phase between the signals on the first and second antenna array columns referred to the transceiver 27. Adjustment of the phase shifter 29 will steer the backhaul beam in azimuth; the adjustment could be an electronic or a purely mechanical path length adjustment. The single pole single throw (On/Off) switch 31 could be implemented using PIN diodes, and the control technique could be similar to that used in the embodiment of FIG. 5.

Figure 8:
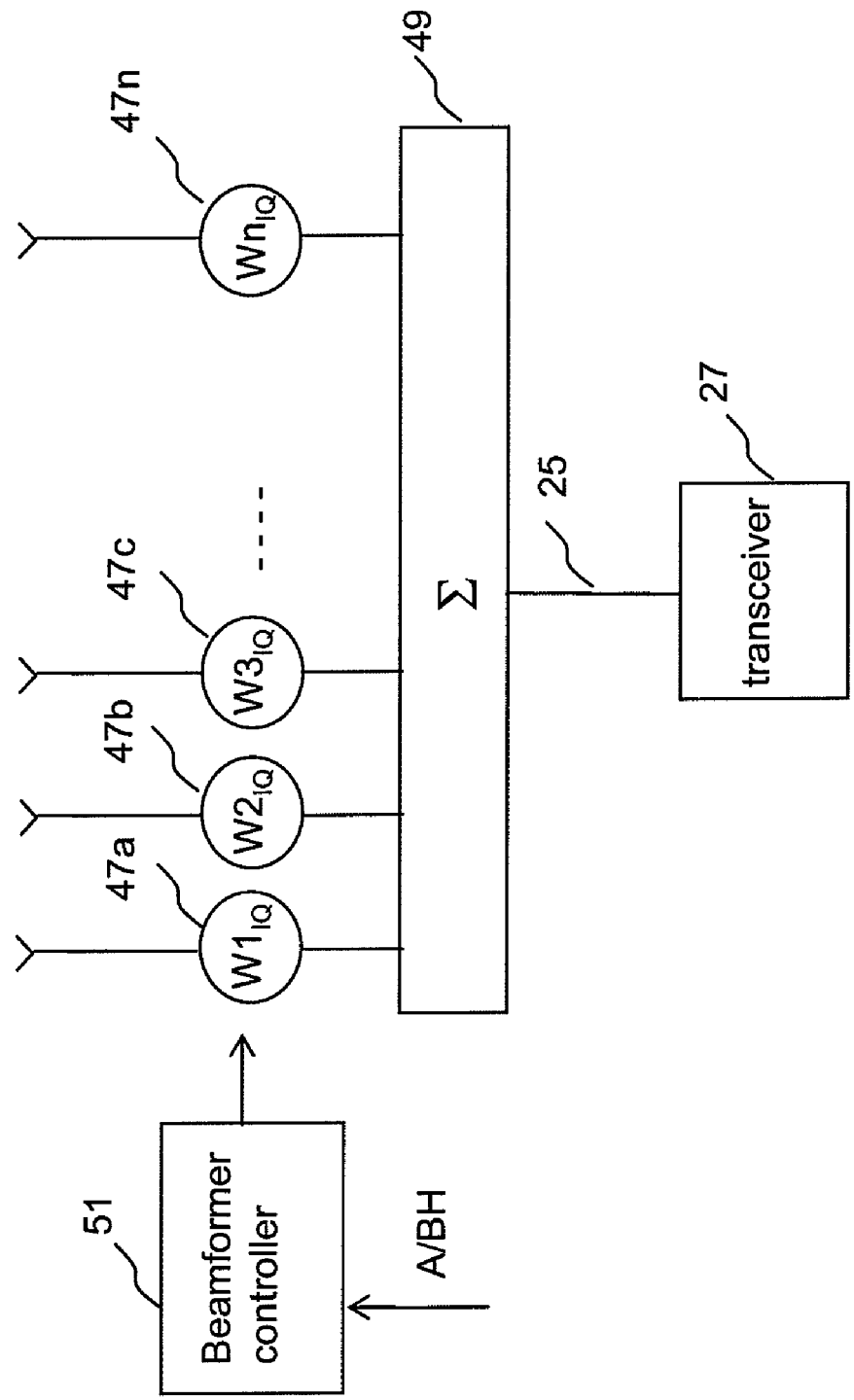
FIG. 8 is a schematic diagram showing a yet further implementation of an antenna system forming part of the transceiving system of FIG. 3.

FIG. 8 shows another alternative embodiment of the switched antenna system. In this arrangement, the antenna system is embodied by a multi-element beamformer, comprising an array of weight values 47a . . . 47n that are used to control the amplitude and phase of signals transmitted and received by an array of antenna elements. A beamformer controller 51 controls the application of weights to be suitable for producing the antenna patterns appropriate for backhaul or access mode. The application of weights to antenna elements using a beamformer is well known in the field of phased array radar and electronic beam steering generally. The benefit of the electronic beam steering technique is the degree of control it gives over the precise shape of the antenna beam, thereby allowing the optimization of the link gain or other system parameters. In addition, nulls may be steered in the direction of interference sources to maximize the signal to noise plus interference ratio.

Figure 9:
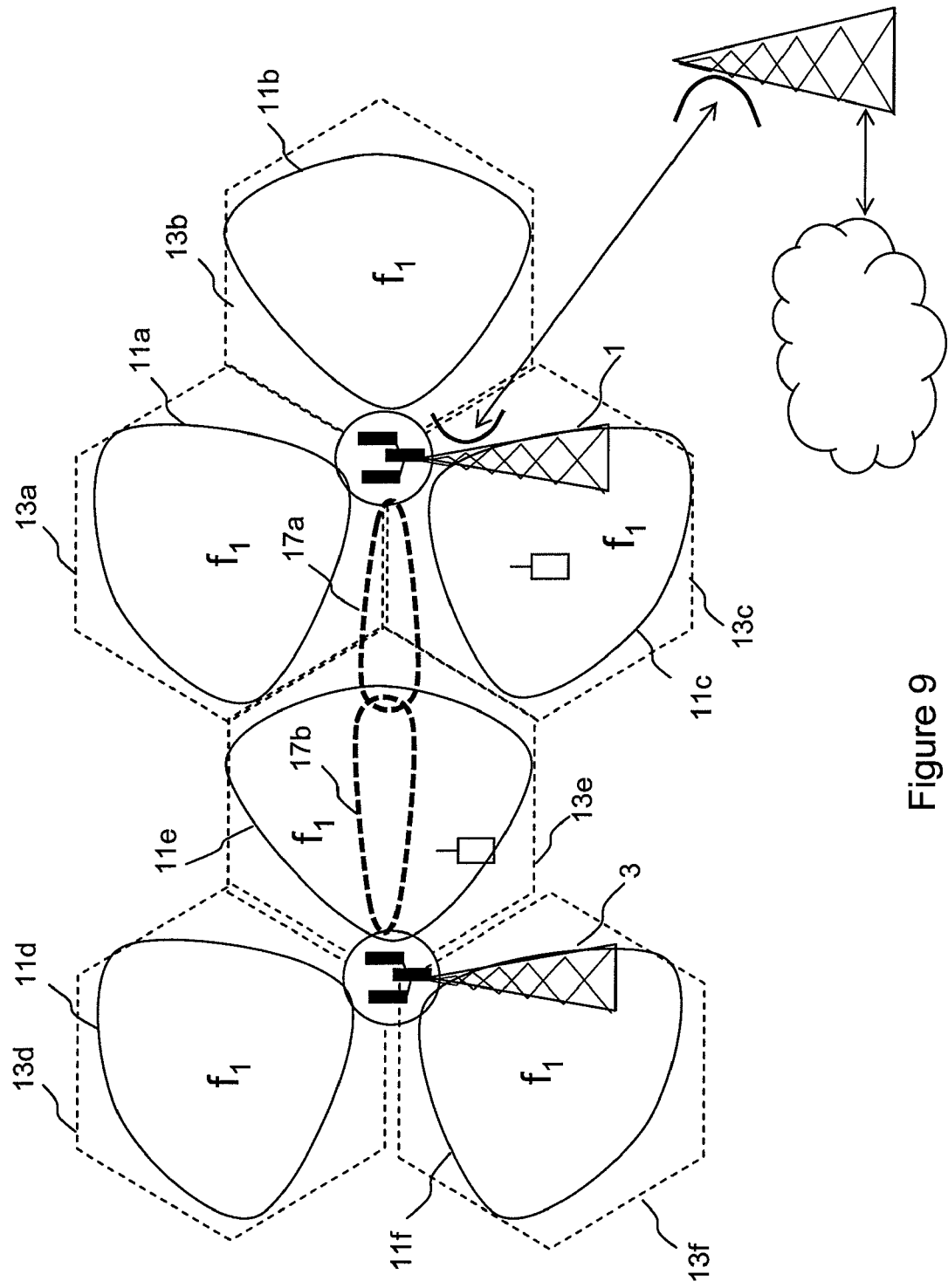
FIG. 9 is a diagram showing a network of transceiving systems of FIG. 3, each implementing switched antennas according to an embodiment of the invention between access and backhaul modes in a single frequency network.

FIG. 9 shows an application of an embodiment of the invention, in which a single frequency band is used (a so-called N=1 frequency re-use scheme), and in which backhaul is provided from a second base station 3 is a conventional tri-cellular base station of similar characteristics to those of the first base station 1 and is similarly typically mounted on a tower. As a result, antennas with different radiation patterns for backhaul and access modes are used on both of the base stations. The conventional tri-cellular arrangement is shown by hexagonal cells 13a . . . . 13f, each of which receives wireless coverage from antenna pattern 11a . . . 11f. A feature of a tri-cellular arrangement is that a neighbouring base station will tend to fall into a null in the antenna patterns of a given base station; this is illustrated by examination of the beam from the second base station 3 indicated by reference numeral 11e. The radiation patterns 11a, 11c of the antennas on the side of the first base station 1 facing the second base station 3 have nulls towards the second base station 3. It is likely, therefore, that any link between the first and second base stations 1, 3 using access antennas would produce a link with a poor signal quality due to poor antenna gain. This example illustrates the benefit of using alternative antennas for access: it can be seen that antenna patterns with reference numerals 17a and 17b can be made to align and therefore produce a link that would be expected to exhibit a high signal to noise ratio. Such a link could exploit adaptive modulation and coding techniques to give a high data rate, thereby requiring a smaller share of transmission time than would be the case if the data rate on the link were lower.

Figure 10:
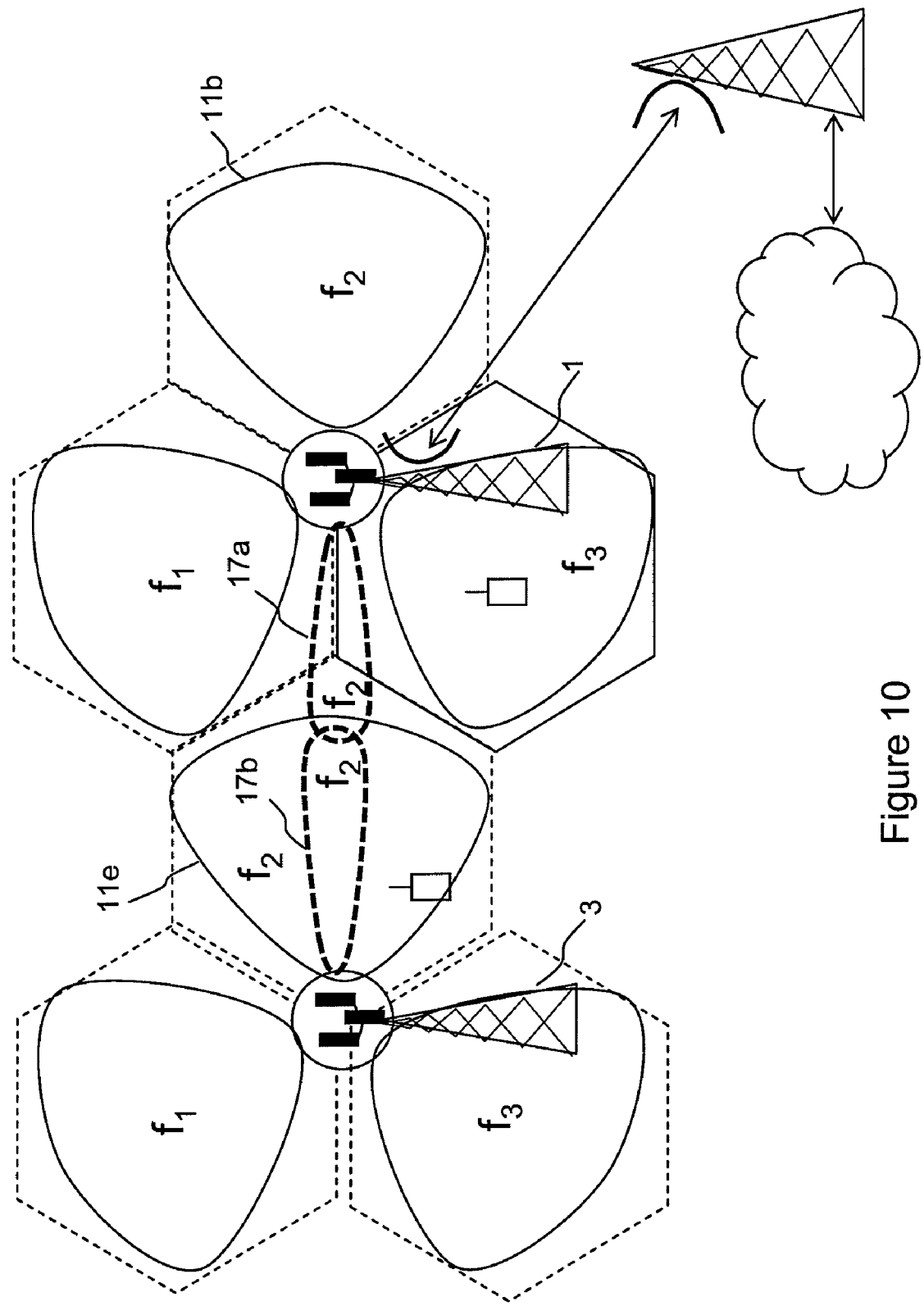
FIG. 10 is a diagram showing a network of transceiving systems of FIG. 3, each implementing switched antennas according to an embodiment of the invention between access and backhaul modes for a network employing three frequency bands.

FIG. 10 illustrates a variation of the scheme illustrated in FIG. 9, in which three frequency bands are used: a so-called "N=3 frequency re-use" scheme. In this configuration, each base station will provide coverage to three cells, each in a different frequency band: the access beam 11e emanating from the second base station 3 pointing towards the first base station 1 operates at frequency band f2, whereas the access beam operating at f2 from the first base station 1 is indicated by reference numerals 11b and faces directly away from the second base station 3. This is an example of a case which particularly benefits from the application of switched antennas between access and backhaul modes; the beams indicated by reference numerals 17a and 17b can be set up to operate at the same frequency so they can communicate with each other, in this case at frequency f2. Note that this arrangement may require switching between an access antenna on one side of a given antenna tower and a backhaul antenna on the other side of the tower: as between beams indicated by reference numerals 17a and 11b.

Figure 11:
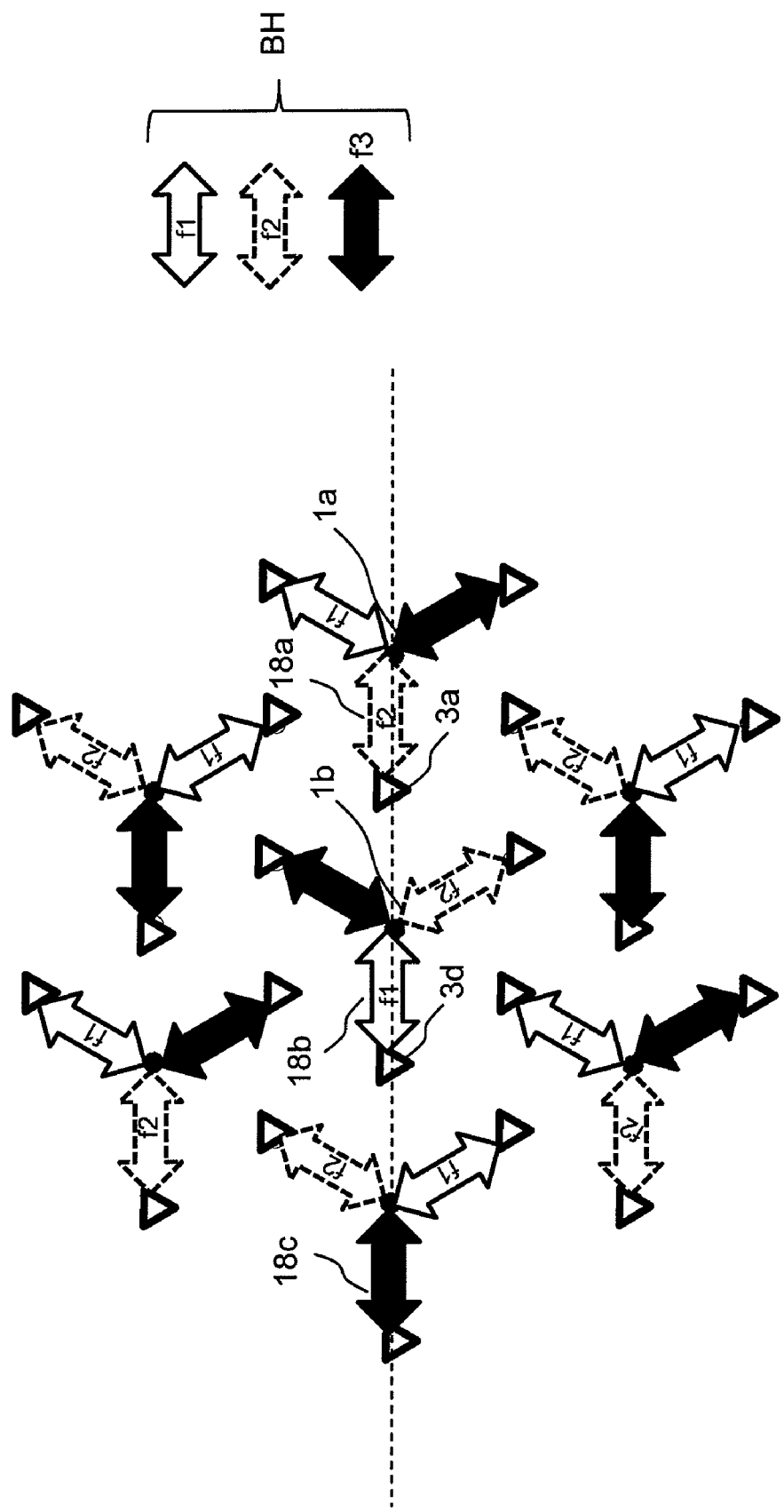
FIG. 11 is a diagram showing allocation of frequencies to backhaul links in a network of transceiving systems of FIG. 3, configured to employ three frequency bands.

FIG. 11 illustrates a frequency re-use pattern that could be used for multiple backhaul links in an N=3 frequency reuse scheme according to figure 10. The Figure shows theoretical signal outputs of a particular configuration of first base stations (including those referenced by parts 1a and 1b) and second base stations (including those referenced by parts 3a and 3d): due to the tri-cellular layout illustrated, the backhaul links would appear to line up, thereby introducing the potential for interference from a distant base station. In practice the deployment of antennas is unlikely to match that of a theoretical grid, but it is nevertheless possible for a backhaul beam to experience interference in this way. More specifically, from the Figure it can be seen that if base stations at positions indicated by 1b and 3d were to use frequency f2 for the backhaul link 18b the transmissions from the second base station labeled 3d would be directly in line with the backhaul link 18a of the first base station labeled 1a and vice versa. Advantageously, however, the configuration of FIG. 11 provides a mechanism for selecting the frequency of operation of respective backhaul links, thereby effectively adjusting the distance between links that are in line with one another and operating at the same frequency. Indeed, in the arrangement shown, the base stations have been configured so as to ensure that these backhaul links 18a, 18b, 18c do not operate at the same frequency.

In the description above relating to various configurations for the antenna selection system, the backhaul and access signals are described as being transceived within the same frequency band. It will be appreciated that this covers at least two different arrangements: a first in which the respective signals use the same channel (implying time division only), and a second in which the respective signals use different, e.g. adjacent, channels (implying frequency division as well as time division). Whilst the above embodiments relate to the former, time-division only, arrangement, the scope of the invention covers both arrangements. Indeed, in order to accommodate the latter arrangement, the antenna selection system would additionally include a frequency switching component.

The above embodiments are to be understood as illustrative examples of the invention, and other embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A system for transceiving signals in a cellular wireless communications network, the cellular wireless communications network comprising a first base station, a second base station and a user equipment terminal, the system being arranged to receive a message apportioning timeslots for particular types of transmission, said message being received at the first base station, the second base station and said user equipment terminal, wherein the system is arranged to transceive first signals between the first base station and the second base station in a first timeslot on the basis of timeslots apportioned in said message, and to transceive second signals between the first base station and said user equipment terminal in a second timeslot on the basis of timeslots apportioned in said message, the second signals occupying at least part of the frequency band occupied by the first signals,
wherein the system comprises:
a first antenna system of a first type arranged to transceive said first signals at the first base station; and
a second antenna system of a second type, different from the first type of antenna system, arranged to transceive said second signals at the first base station.

2. A system according to claim 1, comprising a radio frequency switch for connecting the first antenna system to a transceiver for the duration of said first timeslot and for connecting the second antenna system to the transceiver for the duration of said second timeslot.

3. A system according to claim 1, wherein the first antenna system comprises an antenna array having a plurality of antenna elements, and the second antenna system comprises a sub-set of said antenna elements.

4. A system according to claim 3, including a further radio frequency switch for use in selecting said sub-set of antenna elements.

5. A system according to claim 1, each said first and second antenna systems having a beamwidth associated therewith, wherein the beamwidth in azimuth of said first antenna system is narrower than that of the second antenna system.

6. A system according to claim 5, wherein the beamwidth in elevation of the first antenna system is broader than that of the second antenna system.

7. A system according to claim 1, each said first and second antenna systems having a radiation pattern associated therewith, wherein the peak of the radiation pattern of the first antenna system is at a substantially different azimuth bearing than that of the second antenna system.

8. A system according to claim 1, wherein the first antenna system and the second antenna system each comprises a multi-element beamformer adapted to apply a respective set of amplitude and phase weighting values in respective timeslots.

9. A method of configuring a cellular wireless communications network comprising a first base station, a second base station and a user equipment terminal, the method comprising:
receiving a message apportioning timeslots for particular types of transmission, the message being received at the first base station, the second base station and said user equipment terminal;
transceiving first signals between the first base station and the second base station in a first timeslot apportioned in said message; and
transceiving second signals between the first base station and said user equipment terminal in a second timeslot apportioned in said message, the second signals occupying at least part of the frequency band occupied by the first signals,
wherein the method further comprises:
transceiving said first signals by means of a first antenna system of a first type at the first base station; and
transceiving said second signals by means of a second antenna system of a second type at the first base station, the second type of antenna system being different from the first type of antenna system.

10. A method according to claim 9, comprising connecting the first antenna system to a transceiver for the duration of said first timeslot and connecting the second antenna system to the transceiver for the duration of said second timeslot so as to selectively transceive said first signals within said first timeslot and to transceive said second signals within said second timeslot.

11. A method according to claim 10, comprising:
decoding a message indicating a switching point with respect to a count value on a counter;
detecting a characteristic representing a power output of the transceiver as a function of time;
synchronising the counter with the characteristic; and
switching between the first antenna system and the second antenna system in dependence on the count value and the switching point.

12. A method according to claim 11, in which the first antenna system comprises an antenna array having a plurality of antenna elements and the second antenna system comprises a sub-set of said antenna elements, the method further comprising switching between said sub-set of antenna elements in dependence on the count value and the switching point.

13. A method according to claim 12, including applying a first set of amplitude and phase weighting values during said first time slot and applying a second, different, set of amplitude and phase weighting values during a said second timeslot.

* * * * *